United States Patent [19]

Matumoto

[11] Patent Number: 5,383,361
[45] Date of Patent: Jan. 24, 1995

[54] WHEEL BALANCE MEASURING APPARATUS

[75] Inventor: Shigeru Matumoto, Tokyo, Japan

[73] Assignee: Kokusai Keisokuki Kabushiki Kaisha, Tokyo, Japan

[21] Appl. No.: 21,892

[22] Filed: Feb. 24, 1993

[30] Foreign Application Priority Data

| Feb. 26, 1992 [JP] | Japan | 4-075292 |
| Feb. 26, 1992 [JP] | Japan | 4-075293 |
| Feb. 26, 1992 [JP] | Japan | 4-075294 |

[51] Int. Cl.$^6$ .................................................. G01M 1/04
[52] U.S. Cl. ........................................... 73/471; 73/487
[58] Field of Search ................. 73/471, 462, 460, 146, 73/472, 474, 487

[56] References Cited

U.S. PATENT DOCUMENTS

| 3,552,200 | 1/1971 | Hermanns et al. | 73/146 |
| 5,239,867 | 8/1993 | Himmler | 73/460 |
| 5,259,242 | 11/1993 | Folta | 73/146 |

FOREIGN PATENT DOCUMENTS 1264045 3/1968 Germany ................. 73/487

Primary Examiner—Richard E. Chilcot, Jr.
Assistant Examiner—Joseph L. Felber
Attorney, Agent, or Firm—Kane, Dalsimer, Sullivan, Kurucz, Levy, Eisele and Richard

[57] ABSTRACT

A wheel balance measuring apparatus includes a frame, a hollow rim support shaft rotatably supported by the frame through a bearing, a lower rim mounted on the hollow rim support shaft, and an upper rim positioning above and confronting with the lower rim, so as to be shiftable along and rotatable about the vertical axis. A tested wheel is sandwiched between these upper and lower rims and is rotated together with the hollow rim support shaft for measuring dynamic balance of the tested wheel. The apparatus comprises a coupling shaft having an upper end connected integrally with the upper rim and a lower end formed with a plurality of engaging projections arrayed along an axial direction. This coupling shaft is inserted into or pulled out from the hollow rim support shaft. Claws are disposed inside the rim support shaft for selectively engaging with and disengaging from the engaging projections. A shift device shifts the claws between an engaging position and a disengaging position. A drive means is provided to drive this shift device. A rim width of the tested wheel to be held between upper and lower rims is regulated in accordance with an engaging position between the claws and the engaging projections. At least three abutting portions are provided on the outer surface of the coupling shaft, being spaced one another in a circumferential direction. The bearing is rigidly supported only in a detection direction of a displacement load detector.

13 Claims, 10 Drawing Sheets

WHEEL BALANCE MEASURING APPARATUS

BACKGROUND OF THE INVENTION

The present invention relates to a wheel balance measuring apparatus which measures the dynamic balance of the tested wheel, and more particularly to a wheel balance measuring apparatus which has a load detector on the bearing thereof for detecting displacement load imparted on the bearing due to weight unbalance during the rotation of the tested wheel.

In more detail, the wheel balance measuring apparatus to which the present invention is applied is equipped with a pair of upper and lower rims to hold the tested wheel therebetween. The lower rim is mounted on a rim support shaft supported by a bearing, to which a detector for detecting displacement load is connected, rotatably about a vertical axis, and the upper rim is spaced upward from this lower rim so as to confront with each other. The upper rim is shiftable along an up-and-down direction so as to change the clearance between the upper and lower rims, and is rotatably supported about the vertical axis. The tested wheel is firmly sandwiched between these upper and lower rims and rotated about the vertical axis. As the tested wheel has weight unbalance, displacement load is imparted on the bearing and the load detector detects this displacement load. Thus, the dynamic balance of the tested wheel is obtained on the basis of thus obtained detection result.

A conventionally known wheel balance measuring apparatus, which measures the dynamic balance of the tested wheel, is equipped with a pair of upper and lower rims to hold the tested wheel therebetween. The lower rim is mounted on a rim support shaft rotatably supported about a vertical axis by the bearing, and the upper rim is spaced upward from this lower rim so as to confront with each other. The upper rim is shiftable along an up-and-down direction so as to change the clearance between the upper and lower rims, and is rotatably supported about the vertical axis. The tested wheel is firmly sandwiched between these upper and lower rims and rotated about the vertical axis. The displacement loads at the upper and lower ends of the bearing are detected by the detectors. Then, the dynamic balance of tile tested wheel is obtained on tile basis of thus obtained detection result.

In such a conventional measuring apparatus, it is necessary to firmly engage the upper rim with the lower rim not to move by the pressure of tile compressed air supplied in the tested wheel during the testing operation. On the contrary, it is also necessary to completely remove the upper rim from the lower rim when the tested wheel is taken out.

For these reasons, a coupling shaft, fixed to the upper rim so as to extend downward from the bottom of this upper rim, is inserted in a coupling hole of the rim support shaft. The upper and lower rims are adjusted to fit to the rim width of the tested wheel, and engaged together to maintain thus adjusted clearance.

The bearing, which supports the rim support shaft, needs to be supported in the following manner. The rigidity of the bearing is low in tile displacement load detecting direction of the detector so that the detector can detect the displacement load effectively, while the rigidity of the bearing is high in other directions. Namely, the bearing is resiliently supported to cause vibration in the displacement load detecting direction of the detector, but is rigidly supported not to cause vibration in other directions.

It is desirable for such a conventional wheel balance measuring apparatus to be applicable to a plurality sizes of tested wheels. It is necessary, in order to realize this, to integrally form a plurality of rims of different diameters so as to adjust tile upper and lower rims to fit to the rim width of any kind of tested wheel. On the other hand, it is not easy to provide a firm fixing structure capable of bearing compressed air in the wheel.

Furthermore, in order to ensure the coupling and detachment, a predetermined tolerance needs to be provided between the coupling shaft and the coupling hole of the rim support shaft. However, when the tested wheel is inflated during the measuring operation, the coupling shaft causes the inclination with respect to the coupling hole. As a result, the upper rim inclines against the lower rim. This induces the measurement error. As the inclination direction cannot be predicted, it was impossible to correct the measurement error caused by this inclination.

Still further, it is actually impossible to support the bearing, which supports the rim support shaft, not to cause any vibration in the directions other than the displacement load detecting direction of the detector. Therefore, vibrations caused in the directions other than the displacement load detecting direction of the detector also cause the measurement error.

Moreover, tile bearing receives impact force in the up-and-down direction when the tested wheel is installed on or removed from the rims. The detector may be damaged or its accuracy may be deteriorated by receiving this impact force.

SUMMARY OF THE INVENTION

Accordingly, the present invention has a purpose, in view of above-described problems or disadvantages, to provide a wheel balance measuring apparatus having a separate rim fixing structure capable of accurately maintaining the rim width against compressed air in the tested wheel.

Another purpose of the present invention is to provide a wheel balance measuring apparatus having a separate rim coupling structure capable of regulating the inclination direction of the coupling shaft with respect to the coupling hole and correcting the measuring result.

Still another purpose of the present invention is to provide a wheel balance measuring apparatus having a detector connecting structure capable of effectively transmitting vibration acting in the displacement load detection direction of the detector, and preventing other vibrations from being transmitted to the detector.

The above and other objects, features and advantages of the present invention will become more apparent from the following detailed description which is to be read in conjunction with the accompanying drawings.

DETAILED DESCRIPTION OF THE PREFERRED EMBODIMENT

Hereinafter, with reference to accompanying drawings, one preferred embodiment of the present invention is explained in detail.

Figure 1:
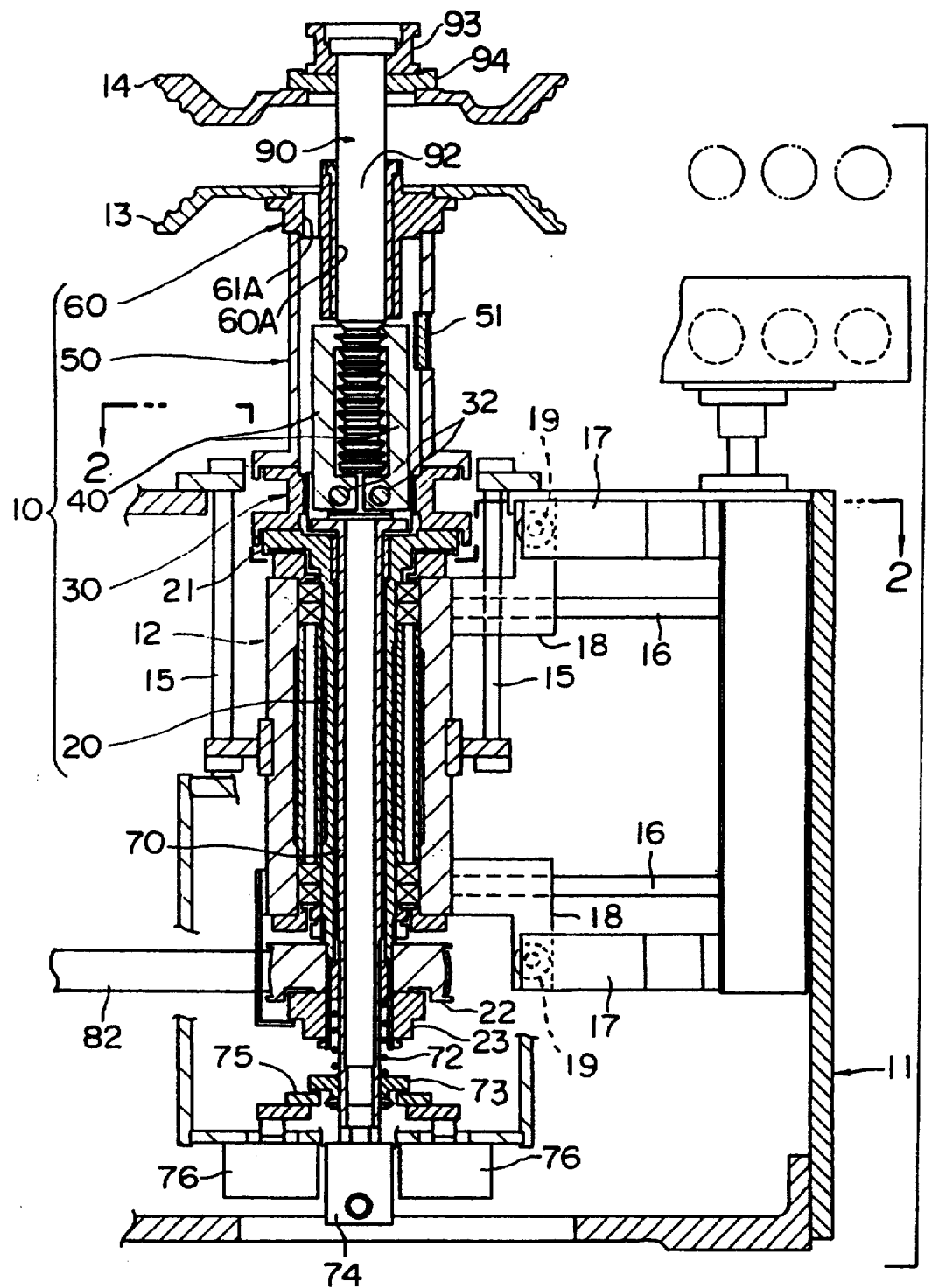
FIG. 1 is a sectional front view showing a configuration of a wheel balance measuring apparatus in accordance with one embodiment of the present invention.

As shown in FIG. 1, the wheel balance measuring apparatus in accordance with the present invention basically comprises a frame 11, a bearing 12, a cylindrical spindle 10, a lower rim, and a upper rim 14. The bearing extends vertically and is supported by the frame 11. The cylindrical spindle 10 serves as a rim support shaft which supports the lower rim 13 fixedly at the top thereof. The upper rim 14 positions above this lower rim 13, and is raised or lowered by an appropriate elevation mechanism (not shown) along the vertical axis. By the way, the vertical direction is an up-and-down direction in the drawing of FIG. 1.

Vertical torsion bars 15 extend in parallel with this bearing 12 at both sides of this bearing 12. These vertical torsion bars 15 hang the bearing 12 on the frame 11. Furthermore, lateral torsion bars 16 extend normal to this bearing 12, so as to connect upper and lower ends of the bearing 12 to the frame 11. With this arrangement, the bearing 12 is supported on tile frame 11 with high rigidity in each of the right-and-left direction and the up-and-down direction which are identical with compression and extension directions of the torsion bars 15, 16. On the contrary, the bearing 12 is supported on the frame 11 with low rigidity in the back-and-forth direction (a perpendicular direction of the paper on FIG. 1) since this direction is the bending direction of the torsion bars 15, 16.

L-shaped connecting plates 18 are provided in the vicinity of the connecting points between the rear sides of lateral torsion bars 16 and the bearing 12. The L-shaped connecting plate 18 has one end connected to the bearing 12 and the other end connected with a load cell 17 through a joint 19. The load cell 17 is secured on the frame 11 and serves as the displacement load detector in this embodiment, details of which will be explained later.

The load cell 17 has a rectangular parallelopiped contour, and has an opening provided at the longitudinal central portion thereof. The purpose of providing this opening is intentionally forming a weak thin portion on the load cell 17, inside of which the strain gauge (not shown) is attached. Each load cell 17 can detect the displacement amount of the weak thin portion by measuring the change of electric resistance value of the strain gauge, which is induced by the deformation of this weak thin portion.

Figure 2:
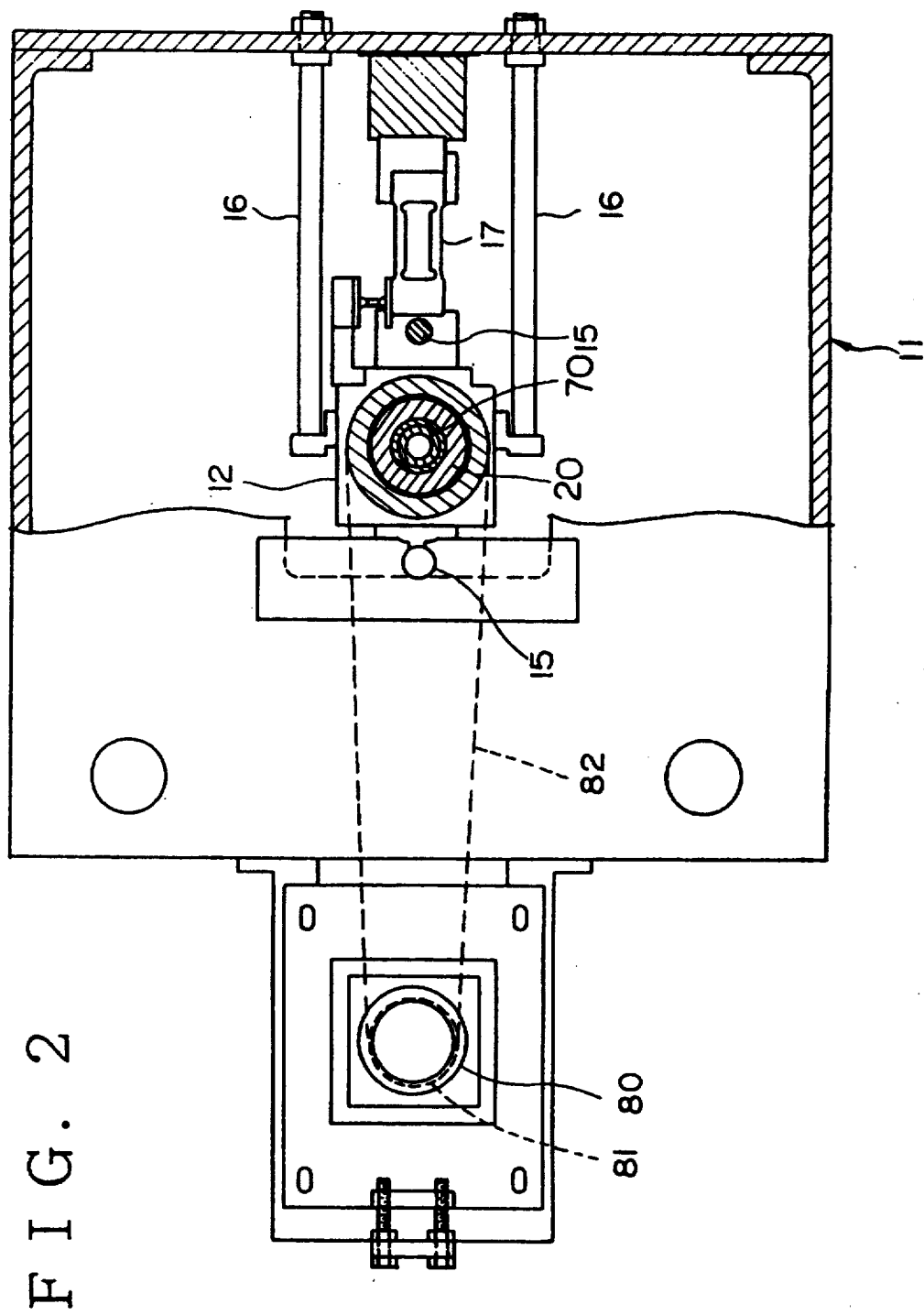
FIG. 2 is a sectional plane view showing the wheel balance measuring apparatus in accordance the first embodiment, taken along a line A—A of FIG. 1.

Furthermore, each load cell 17 is fixed to the frame 11 at its base end and is disposed in parallel with the lateral torsion bar 16. That is, the load cell 17 causes the displacement at the distal end (i.e. at the side adjacent to the, joint 19) in the direction normal to the paper of FIG. 1 (i.e. the right-and-left direction in FIG. 2), and this displacement amount is detected by the strain gauge.

Figure 3:
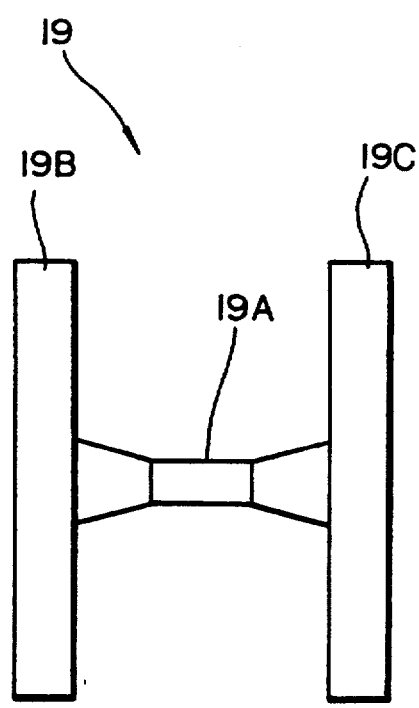
FIG. 3 is an enlarged plane view showing a joint shown in FIG. 1.

The joint 19 includes a connecting shaft 19A and a pair of connection plates 19B, 19C, as shown in FIG. 3. The connecting shaft 19A is substantially column-shaped and the connecting plates 19B, 19C are disk shaped. The connecting shaft 19A is connected to the center of each of the connecting plates 19B, 19C at the both ends thereof, so that the connecting shaft 19A is normal to each of the connecting plates 19B, 19C.

Accordingly, the joint 19 has high rigidity in the axial direction (i.e., the buckling direction) of the connecting shaft 19A, but has low rigidity in the bending direction of the connecting shaft 19A. In other words, the joint 19 is deformable in the bending direction of the connecting shaft 19A.

The connecting shaft 19A has tapered right and left ends portions, gradually increasing their diameters as they approach the corresponding connecting plates 19B, 19C. One connecting plate 19B is connected to the side surface of one end of the L-shaped connecting plate 18, and the other connecting plate 19C is connected to the side surface of the distal end of the load cell 17. The load cell 17 and the L-shaped connecting plate 18 confront with each other via this joint 19. The other end of the L-shaped connecting plate 18 is connected to the bearing 12. Accordingly, the load cell 12 is connected with the bearing 12 through the joint 19 and the L-shaped connecting plate 18.

As a result, the high rigidity direction (the axial direction of the connecting shaft 19A) of the joint 19 coincides with the low rigidity direction of the bearing 12 being supported by the torsion bars 15, 16. With this arrangement, the displacement load of the bearing 12 imparts on the load cell 17 through the joint 19 in the low rigidity direction of the bearing 12 which is supported by the torsion bars 15, 16. Thus, the load cell 17 can detect this displacement load.

The spindle 10 comprises a support shaft portion 20 which is rotatably supported about the vertical axis by the bearing 12, a chuck bracket 30 which is mounted on a flange 21 of the support shaft portion 20 protruding above the bearing 12, a pair of engaging claws, chuck claws 40, 40, which is swingably supported on the chuck bracket 30 at the lower end thereof, a cylindrical ring shaft 50 connected with the upper end of the chuck bracket 30, and a guide sleeve 60 attached on the upper end of the ring shaft 50.

In more detail, the support shaft portion 20 is formed in a hollow cylindrical shape with a large diameter flange 21 on which the chuck bracket 30 is mounted. The lower end of the support shaft portion 20, protruding below the bearing 12, is fixed with a pulley 22 so as to rotate together. An encoder 23 is coaxially provided beneath the pulley 22. Furthermore, an operation shaft 70 is inserted inside the support shaft portion 20 so as to be slidable in the vertical direction.

As a drive source, a drive motor 80 is provided near the frame 11 in parallel with the bearing 12. The drive motor 80 has a pulley 81 fixed to the spindle thereof. An endless belt 82 is wound around these pulleys 22 and 81. Therefore, the pulley 22 (i.e. the spindle 10) is driven to rotate by the rotational force of the drive motor 80, transmitted through this endless belt 82.

Figure 4:
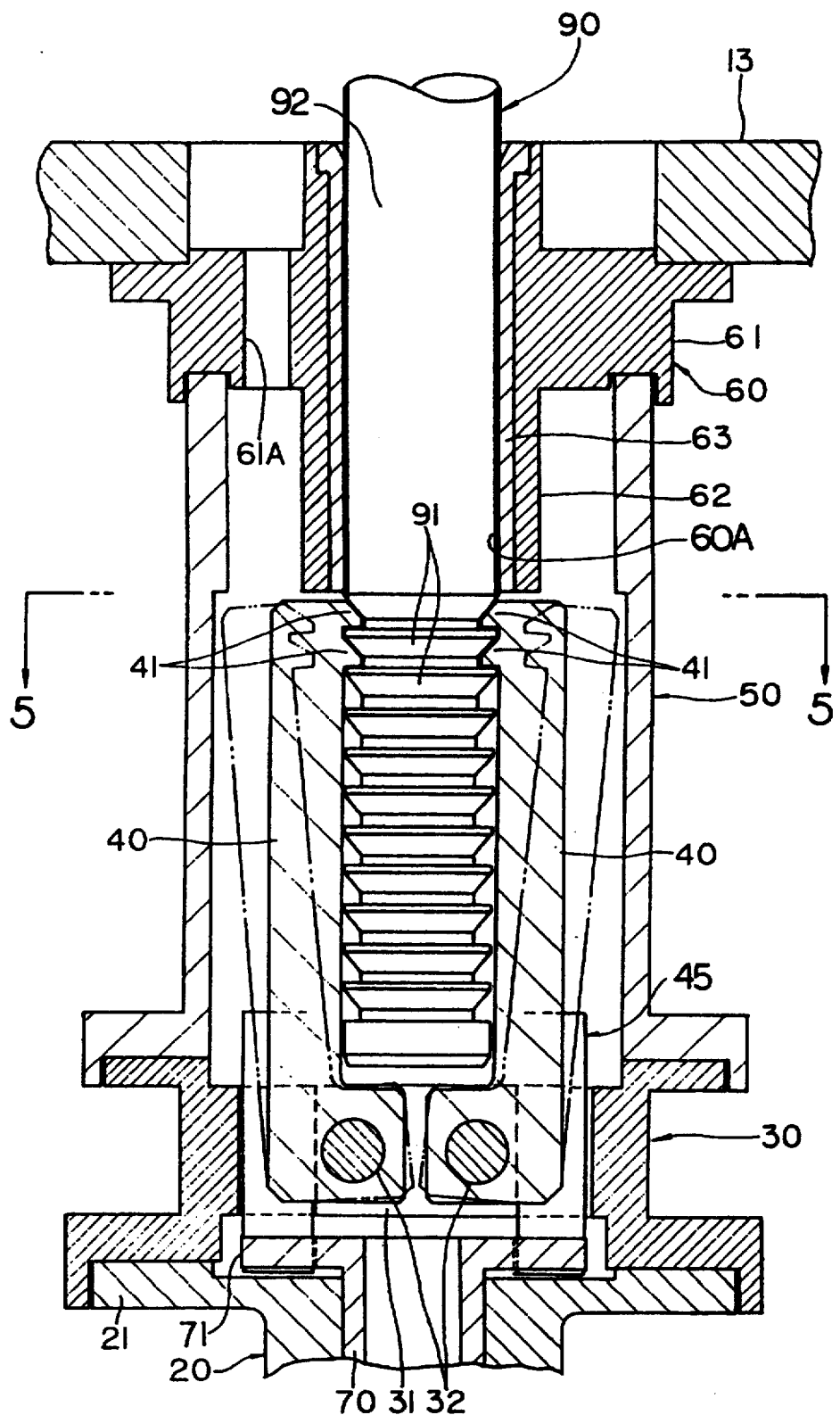
FIG. 4 is an enlarged sectional front view showing the essential part of FIG. 1.
Figure 5:
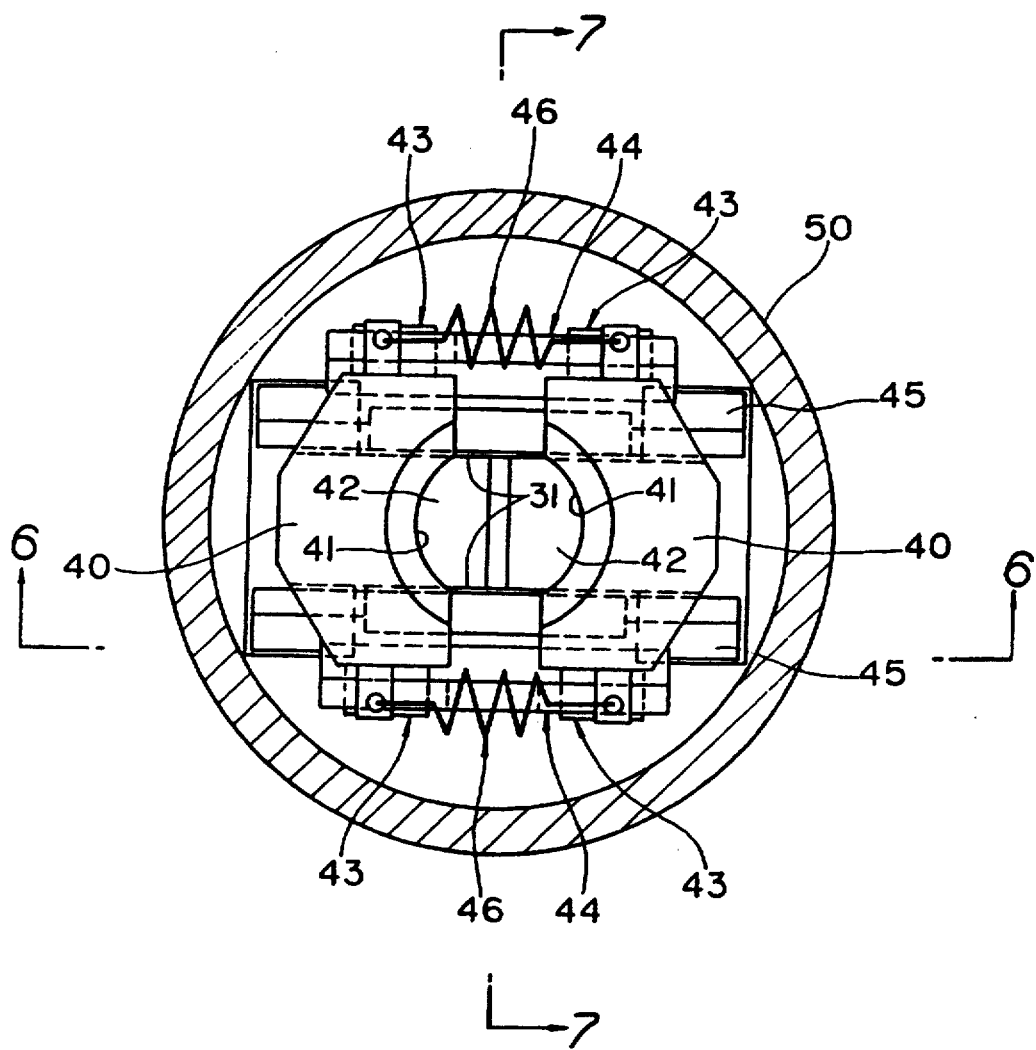
FIG. 5 is a sectional plane view, taken along a line B—B of FIG. 4.
Figure 6:
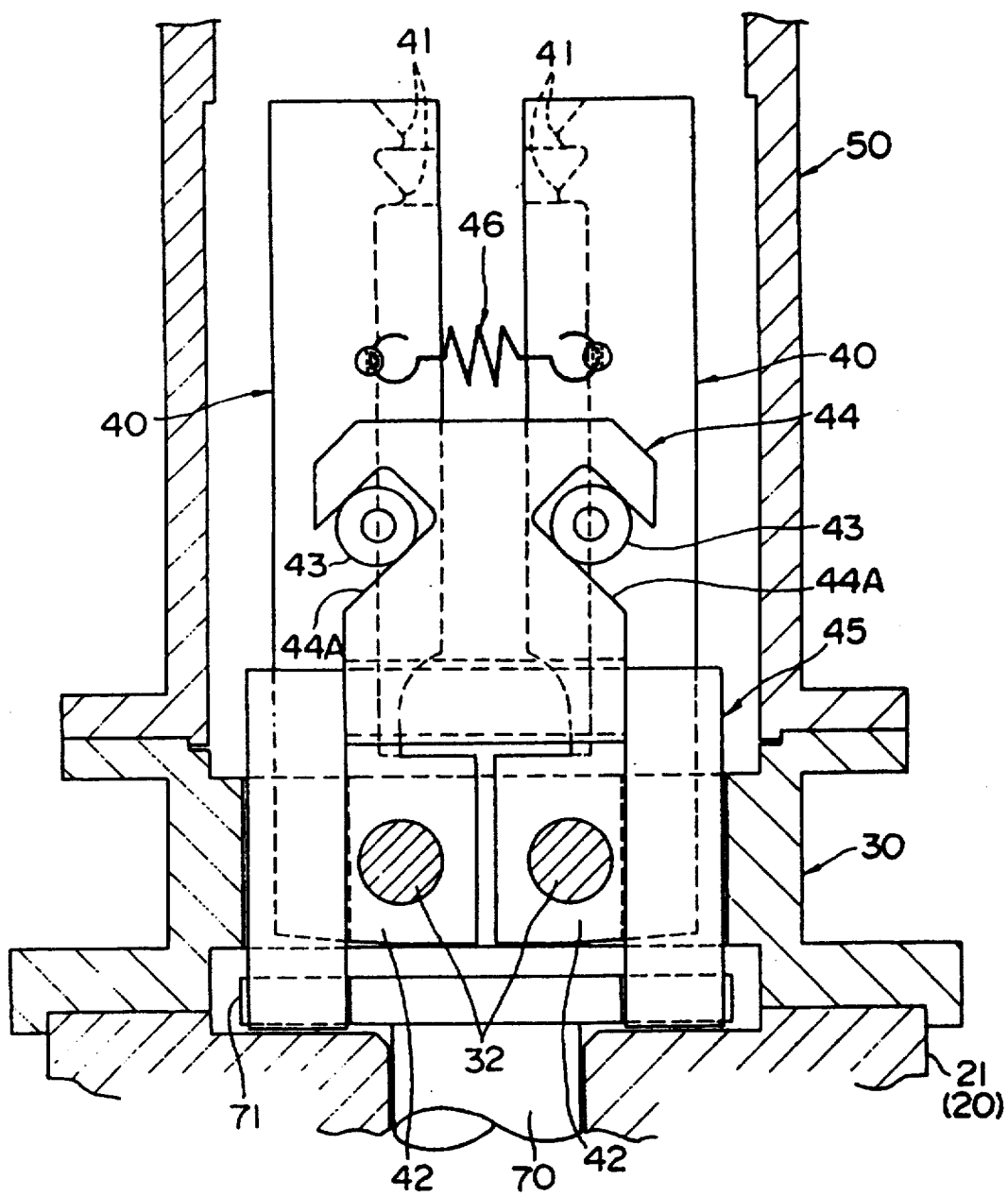
FIG. 6 is a sectional front view, taken along a line C—C of FIG. 5.
Figure 7:
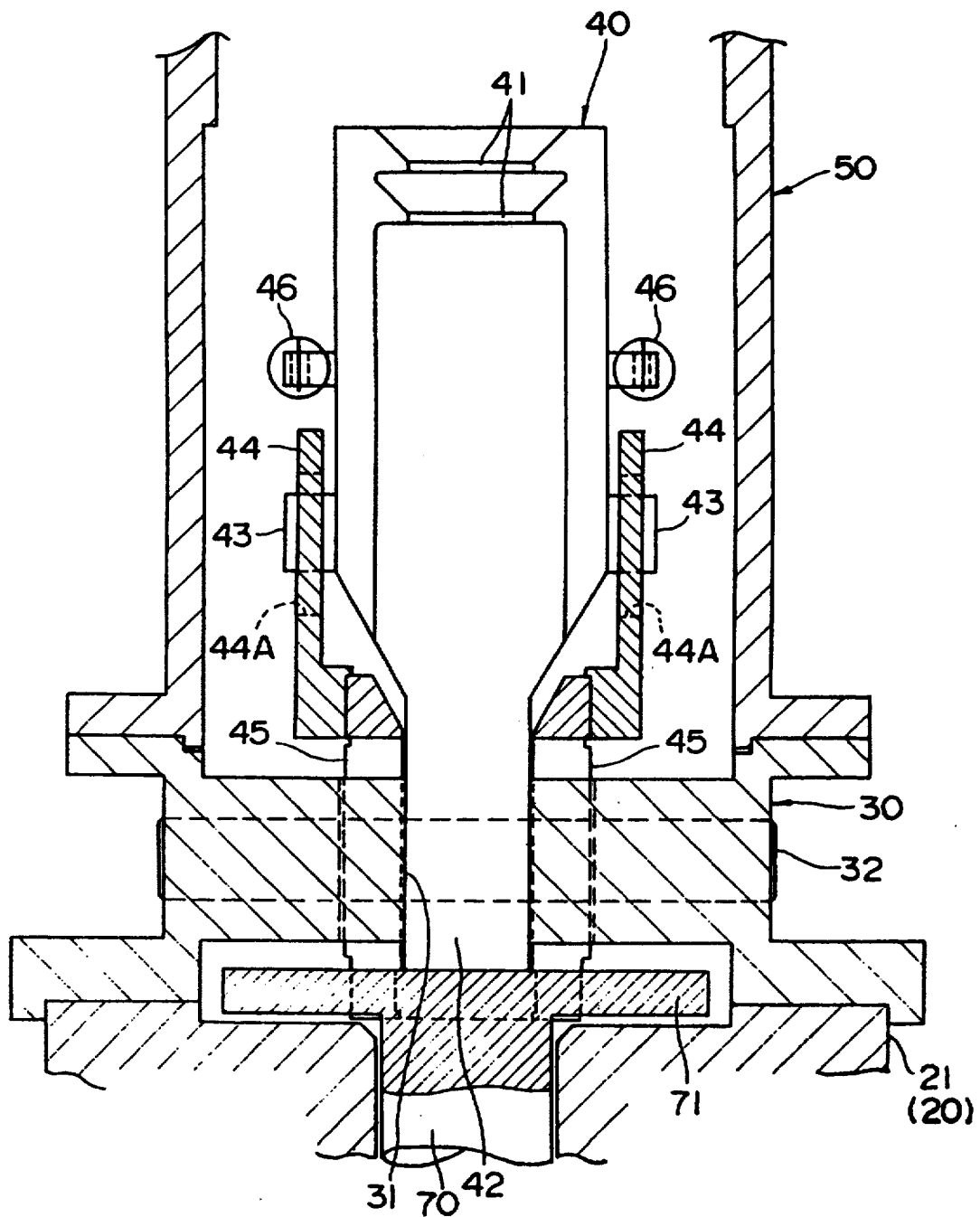
FIG. 7 is a sectional side view, taken along a line D—D of FIG. 5.

The chuck bracket 30 is fixed on the upper surface 21 of the support shaft portion 20 as shown in FIG. 4. The ring shaft 50, which surrounds a pair of above-described chuck claws 40, 40, is fixed on the upper surface of this chuck bracket 30. The lower end of each chuck claw 40 is swingably supported on the inside surface of the chuck bracket 30.

Both of chuck claws 40, 40 are formed in semi-cylindrical shape being symmetric about the vertical axis as shown in FIGS. 4 through 7. A lock shaft 90, described in detail later, is inserted between these chuck claws 40, 40. Each of these chuck claws 40, 40 has a pair of claws 41, 41 arrayed vertically at the upper end thereof. Each claw 41 has a slant surface extending inward and downward, and a lower surface extending horizontally. That is, the claw 41 has a cross section of a right triangle. A clearance between two claws 41, 41 is, for example, 0.5 inches in the vertical direction.

Furthermore, the lower end of each chuck claw 40 is formed into an installation base 42. These installation bases 42, 42 are inserted in a support recess 31 in such a manner that these chuck claws 40 confront with each other. The lower ends of these claws 40, 40 are supported by hinge shafts 32, 32, which are bridged between both ends on the chuck bracket 30 to extend horizontally.

Each chuck claw 40 has a cam follower 43 rotatably provided on its side surface centrally in the up-and-down direction, so as to be parallel to the hinge shaft 32. Cam plates 44 are disposed at front and rear sides of the chuck claws 40, 40. Each cam follower 43 is slidably engaged with a cam slit 44A formed on the cam plate 44. These cam follower 43 and the cam plate 44 cooperate with each other to open or close the chuck claws 40, 40. When the cam follower 43 is engaged with the cam plate 44, the chuck claws 40, 40 are restricted not to cause swing motion.

A spring 46, provided above the cam followers 43, 43, connects both chuck claws 40, 40. Therefore, both chuck claws 40, 40 are urged to bring their upper ends close with each other by the spring force of this spring 46.

The cam plate 44 is fixed through support legs 45, 45 on an upper flange portion 71 of the operation shaft 70, which is inserted in the support shaft portion 20 of the spindle 10. The cam slits 44A, 44A are symmetrically formed at both ends of this cam place 44, so as Lo inclinedly extend upward from the edge to the center. With this arrangement, cam followers 43, 43, engaged with these cam slits 44A, 44A, shift away from each other in the right-and-left direction when the cam plate 44 rises in the up-and-down direction.

The chuck claws 40, 40 stand vertically when the operation shaft 70 (i.e. cam place 44) positions at the lowest end of the up-and-down stroke, as shown in FIG. 4 through 7. If the operation shaft 70 rises from this condition, the claws 40, 40 cause swing motion to open their upper ends away from each other.

The operation shaft 70 is made of a hollow shaft as shown in FIG. 1. This operation shaft 70 is inserted in the support shaft portion 20 of the spindle 10 in such a manner that it can slide a predetermined amount of stroke in the axial direction. Furthermore, the lower end of the operation shaft 70 protrudes below the lower end of the support shaft portion 20 of the spindle 10. An operation ring 73 is fixed around the outer surface of this lower end of the operation shaft 70. A spring 72 is provided to interpose between the support shaft portion 20 and the operation ring 73. By virtue of the spring force of this spring 72, the operation shaft 70 is urged downward with respect to the support shaft portion 20.

The lowermost end of the operation shaft 70 is connected to a rotor joint 74, which communicates at the other end with a compressor (not shown). This rotor joint 74 supplies compressed air into the hollow space inside the operation shaft 70, while allowing the operation shaft 70 to rotate.

The uppermost end of this operation shaft 70 has the upper flange 71 on which the support leg 45 supporting the cam plate 44 is fixed.

A drive ring 75 is provided beneath the operation ring 73, so as to abut the lower surface of the operation ring 73. This drive ring 75 is mounted on spindle tips of air cylinders 76, 76, which are fixed on the frame 11 as operational drive means. That is, this drive ring 75 can elevate up to the position where it interferes with the operation ring 73 by a predetermined amount by means of the air cylinder 76. By the drive ring 75 rising with assist of the air cylinder, the operation ring 73 (i.e. the operation shaft 70) is shifted upward against the urging force of the spring 72.

When the operation shaft 70 is elevated by the air cylinder 76, the cam plate 44 rises correspondingly. In response to this rising movement of the cam plate 44, a pair of above-described chuck claws 40, 40 causes swing motion in such a manner that the upper ends of these chuck claws 40, 40 shift away from each other against the urging force of the spring 46.

The ring shaft 50 is formed in a larger diameter cylinder, as shown in FIG. 4, so that the chuck claws 40, 40 can be accommodated therein. Furthermore, the guide sleeve 60 is coaxially attached on the upper end of the ring shaft 50. By the way, a reference numeral 51 in FIG. 1 represents a sealed window which is made of transparent acrylic resin.

The guide sleeve 60 comprises a flange portion 61 fixed on the upper end of the ring shaft 50, and a smaller-diameter guide portion 62 protruding from the center of this flange portion 61 in both up and down directions. This guide portion 62 has a through hole in the axial direction, inside of which a liner 63 is inserted so as to fit to the inner surface of the through hole. A diameter of a coupling hole 60A is predetermined with the inner surface of this liner 63.

The flange portion 61 includes an air passage 61A opened thereon for communicating the inside and the outside of the ring shaft 50. This flange portion 61 mounts a lower rim 13 on the upper surface thereof.

The lower rim 13 is formed in a disk shape and has an outermost end being formed stepwise to provide a plurality of rims (three kinds rims are disclosed in FIG. 1), whose diameters are different with each other. As previously described, the upper rim 14 is disposed above this lower rim 13. In the same manner as the lower rim 13, the upper rim 14 is formed in a disk shape with an outermost end being formed stepwise to provide a plurality of rims (three kinds rims are disclosed in FIG. 1), whose diameters are different with each other. This upper rim 14 is fixed with a folder 93 through an adapter, 94. The folder 93 is raised upward by an appropriate support mechanism (not shown). Both of plural rims formed on the upper and lower rims 13, 14 are identical with each other in their diameters so as to provide a plurality of sets of upper and lower paired rims.

Figure 8:
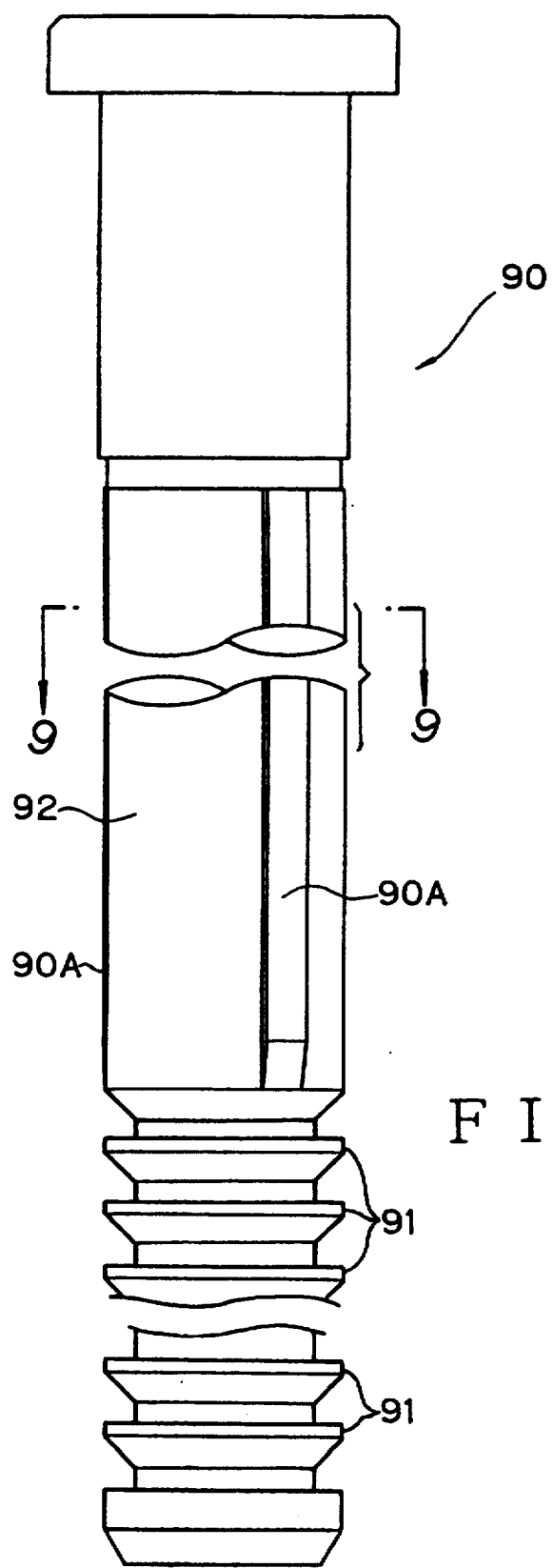
FIG. 8 is a front view showing a lock shaft.
Figure 9:
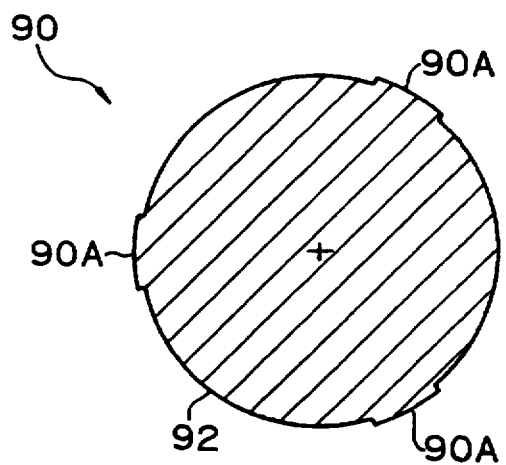
FIG. 9 is a sectional plane view showing the lock shaft, taken along a line E—E of FIG. 8.

The holder 93 Fixes the upper end of the lock shaft 90, which is inserted into the central opening of the lower rim 13. As shown in FIGS. 8 and 9, this lock shaft 90 includes a shaft portion 92 coupled into the coupling hole 60A of the guide sleeve 60. The lower portion of this shaft portion 92 is formed with a plurality of engaging projections 91, 99, - - -which engage with the claws 41, 41 of the chuck claw 40 complementarily. A clearance between adjacent two engaging projections 91, 91 is, for example, 0.5 inches and is the same as that of the claws 41, 41.

Three vertically extending protrusions 90A, 90A, and 90A are formed on the peripheral surface of the shaft portion 92, uniformly spaced with each other (i.e. with the same interval of 120 degrees). An Outer surface of this vertically extending protrusion 90A is configurated to fit to the coupling hole 60A of the guide sleeve 60 with a predetermined tolerance (15-20 $\mu$m). In other words, the remainder of the shaft portion 92 other than these vertically extending protrusions 90A, 90A, and 90A is spaced inwardly from the inner surface of the coupling hole 60A with a predetermined gap (approximately 0.5 mm).

The relationship between the engaging projections 91 and the claws 41 of the chuck claws 40 is determined in the following manner. When the lock shaft 90 is inserted into the coupling hole 60A of the guide sleeve 60, a clearance between the upper and lower rims 13, 14 is adjusted to fit to a tested wheel by lowering the upper rim 14. If the clearance between the upper and lower rims 13, 14 fits to the tested wheel, the engaging projections 91 are just engaged with the claws 41 of the chuck claws 40.

When the operation shaft 70 positions at the lowermost end of the up-and-down stroke, the chuck claws 40 stand vertically and therefore the claws 41 of the chuck claws 40 engage with the engaging projections 91 of the lock shaft 90. On the contrary, if the operation shaft 70 is raised the predetermined stroke by the actuation of the air cylinder 76, the chuck claws 40 cause swing motion to disengage the claws 41 from the engaging projections 91.

Next, an operation of the wheel balance measuring apparatus described above, which holds a tested wheel between the upper and lower rims 13, 14 to measure its balance, will be explained below.

First of all, let suppose that the lock shaft 90 is inserted into the coupling hole 60A of the guide sleeve 60 and the engaging projections 91 of the lock shaft 90 are engaged with the claws 41 of the chuck claws 40, as shown in FIG. 1. If the operation shaft 70 is raised upward by the actuation of the air cylinder 76, the chuck claws 40 are disengaged from the engaging projections 91. The lock shaft 90 on which the upper rim 14 is fixed can be pulled out from the guide sleeve 60 in this condition.

Figure 10:
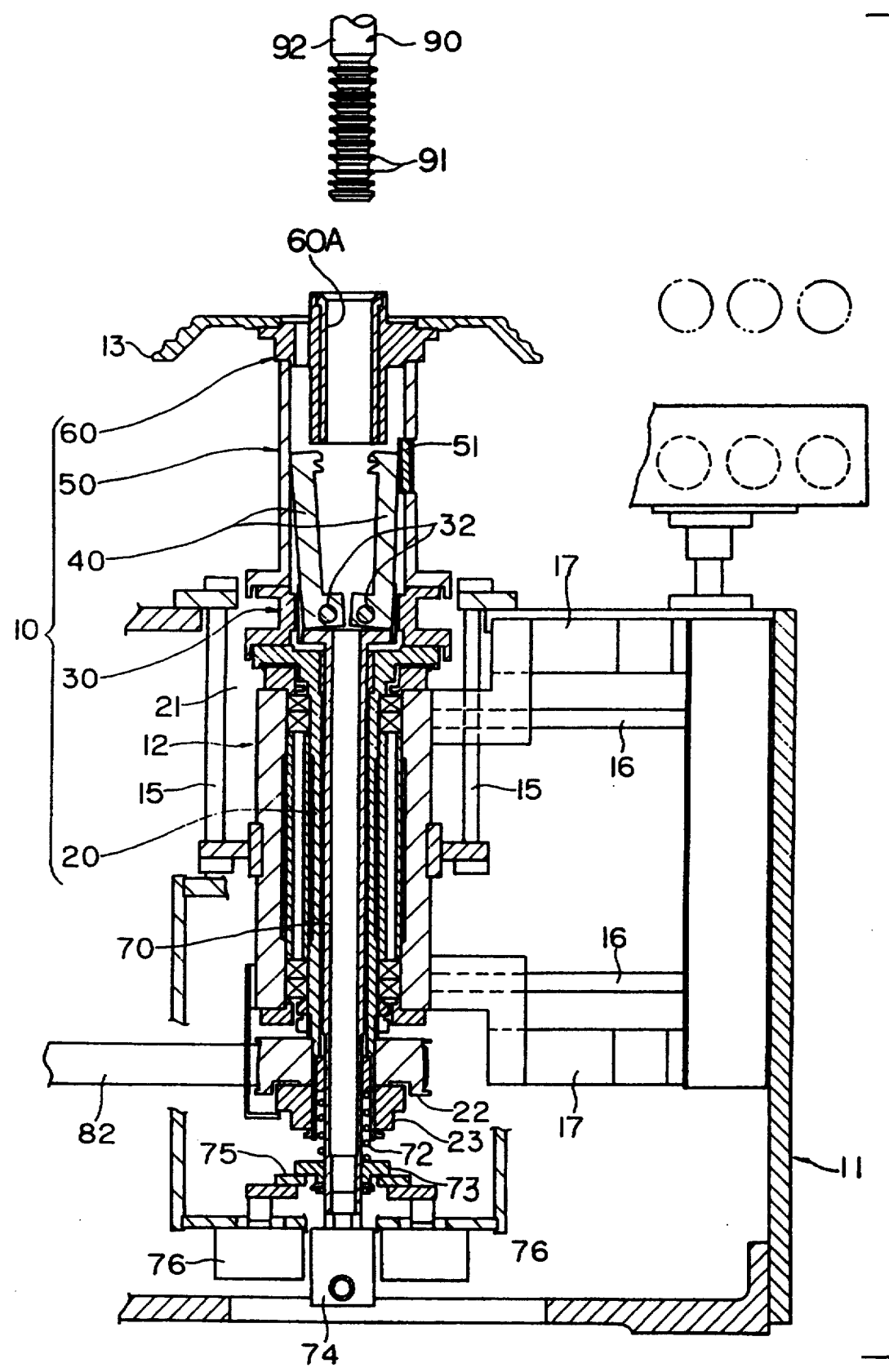
FIG. 10 is a sectional front view showing the wheel balance measuring apparatus whose upper rim is raised upward compared with the condition shown in FIG. 1.

This lock shaft 90, freely supported, is raised upward until it reaches a position far away from the lower rim 13 so as not to interfere with a tested wheel by means of a lifting mechanism (not shown), as shown in FIG. 10. During this lifting operation of the lock shaft 90, the holder 93 (i.e. the lock shaft 90 and the upper rim 14) is clamped so as not to rotate.

Thereafter, a tested wheel, horizontally supported, is conveyed by a conveyor (not shown). This tested wheel is placed on the lower rim 13 in such a manner that their centers coincide with each other. Next, the upper rim 14 (i.e. the lock shaft 90) is lowered, until the lock shaft 90 is inserted into the coupling hole 60A of the guide sleeve 60. When the clearance between the upper and lower rims 13, 14 is identical with that of the rim width of the tested wheel, the air cylinder 76 is deactivated. With this operation, the operation shaft 70 is lowered by the urging force of the spring 72.

As a result, a pair of chuck claws 40, 40 cause swing motion so as to bring their upper ends close with each other. Therefore, the claws 41 engage with the engaging projections 91 of the lock shaft 90. The chuck claws 40, 40 securely engage with the lock shaft 90 by virtue of the urging force of the spring 46. Thus, the tested wheel is surely supported between upper and lower rims 13, 14.

In this supporting condition of the tested wheel, the engaging projections 91 and the claws 41, 41 of the chuck claws 40, 40 are smoothly engaged because they are configurated complementarily. Even if the rim width of the tested wheel is different from that of the precedent tested wheel, the clearance between the upper and lower rims 13, 14 can be finely adjusted, for example at every 0.5 inches. Accordingly, it is possible to change the clearance between the upper and lower rims 13, 14 by shifting the claws 41 with respect to the engaging projections 91 so as to fit to any kind of tested wheel.

Subsequently, compressed air is supplied to the hollow space inside the operation shaft 70 by means of the rotary joint 74. This compressed air is introduced into the tested wheel to inflate this wheel. Namely, compressed air is introduced from the hollow space of the operation shaft 70 through the chuck bracket 30, the ring shaft 50, the air passage 61A formed on the flange 61 of the guide sleeve 60 into the tested wheel.

When the tested wheel inflates, the inside pressure of the tested wheel tends to expand the clearance between the upper rim 14 and the lower rim 13. However, this expansion is surely restricted by the chuck claws 40 and the engaging projections 91 of the lock shaft 90 which are firmly engaged with each other. At the same time, the clearance between the upper rim 14 and the lower rim 13 can be accurately maintained.

Furthermore, in this inflation operation, the shaft portion 92 of the lock shaft 90 causes an inclination in accordance with the coupling tolerance between the outer surface of the vertically extending protrusions 90A, 90A, and 90A and the inner surface of the coupling hole 60A of the guide sleeve 60. Here, the vertically extending protrusions 90A, 90A, and 90A are formed at three portions uniformly spaced in the circumferential direction. As the condition where only one of these three vertically extending protrusions 90A, 90A, and 90A abuts the inner surface of the liner 63 is unstable, any two of these three vertically extending protrusions 90A, 90A, and 90A normally abut the inner surface of the coupling hole 60A. As a result, the lock shaft 90 inclines toward the center of these two vertically extending protrusions 90A and 90A abutting the inner surface of the coupling hole 60A. Namely, the lock shaft 90 inclines toward any one of three directions dividing its outer periphery into three peripheral sections. Thus, the inclined direction can be limited.

In this condition, the spindle 10, the lower rim 13, the tested wheel and the upper rim 14 (i.e. the holder 93, the lock shaft 90) rotate together. These members are driven by the motor 80 to rotate at the predetermined speed. During this rotation, the balance of the tested wheel is measured on the basis of the displacement load of the bearing 12 detected by the load cell 17 and the rotational angle information of the encoder 23.

The bearing 12 may cause vibrations in the axial directions of the torsion bars 15 and 16 (i.e. in the up-and-down direction and right-and-left direction in FIG. 1) against their high rigidities. However, these vibrations act along the low rigidity direction (i.e. the bending direction) of the joint 19. Therefore, these vibration are absorbed by the elastic deformation of the connecting shaft 19A without being transmitted to the load cell 17. Accordingly, no error is caused in the detection.

After the measurement is finished, strong force is required to remove the tested wheel from the lower rim 13 as the bead portion of the tested wheel adheres on the lower rim 13. For this reason, the bearing 12 receives an impact force acting in the up-and-down direction. However, the joint 19 absorbs this impact force, too. Therefore, this impact force is prevented from transmitting to the load cell 17.

In this manner, the load cell 17 is surely prevented from being damaged. The accuracy of the load cell 17 can be also prevented from being deteriorated due to excessive force. That is, the joint 19 has high rigidity in the direction along which the displacement load of the bearing 12 is imparted. The vibration due to the dynamic unbalance of the wheel can be adequately transmitted, while other vibrations acting in the different directions can be absorbed by the elastic deformation of the connecting shaft 19A so as not to be transmitted to the load cell 17.

Moreover, as is described previously, the upper rim 14 inclines during the measurement by an amount corresponding to the tolerance between the shaft portion 92 of the lock shaft 90 and the coupling hole 60A of the guide sleeve 60. This inclination induces an error in the measurement value. However, the inclination direction of the upper rim 14 is limited to any one of three directions spaced one another with 120 degree interval. In other words, the inclination amount (angle) of the upper rim 14 and the error amount of measurement are both known in advance. It is also possible, on the basis of the measurement result, to judge which direction the upper rim 14 inclines. Accordingly, the error can be easily corrected with this judgement.

Still further, a relatively wide clearance is provided between the outer surface of the shaft portion 92 other than the vertically extending protrusions 90A, 90A, and 90A and the coupling hole 60A of the guide sleeve 60. This wide clearance is effective to prevent metal cutting pieces from sticking between the shaft portion 92 and the guide portion 62.

The present invention is not limited to the above-described embodiment and therefore may be variously modified without departing from the spirit of essential characteristics thereof.

For example, though the three vertically extending protrusions 90A, 90A, and 90A are provided on the outer surface of the lock shaft 90 in the above-described embodiment, such abutting portions can be provided on the inner surface (i.e. the inner surface of the liner 63) of the coupling hole 60A of the guide sleeve 60.

Yet further, though the abutting portions are disposed uniformly on the periphery of the lock shaft 90 in the above-described embodiment, these abutting portions need not be disposed uniformly as long as the inclination direction of the lock shaft 90 is regulated. It is needless to say that more than four abutting portions can be provided.

The length of the abutting portion can be shortened by providing it only at the end portion close to the upper rim 14, though it is provided from the upper end to the lower of the lock shaft 90 in the above-described embodiment. The inclination direction of the lock shaft 90 can be also regulated even in such a modification.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A wheel balance measuring apparatus which includes:

a frame;

a hollow rim support shaft supported by said frame through a bearing so as to be rotatable about a vertical axis;

means for rotating said hollow rim support shaft;

a lower rim mounted on said hollow rim support shaft; and an upper rim positioned above and confronting with said lower rim, so as to be shiftable along and rotatable about the vertical axis;

wherein a tested wheel is sandwiched between said upper and lower rims and is rotated together with said hollow rim support shaft for measuring dynamic balance of said tested wheel, said apparatus comprising:

a detecting means connected to said bearing for detecting displacement load of said bearing, which is caused due to weight unbalance of a rotating tested wheel;

a coupling shaft having an upper end connected integrally with said upper rim and a lower end formed with a purality of engaging projections arrayed along an axial direction; said coupling shaft extending downward from said upper rim along its rotational axis so as to be inserted into or pulled out from said hollow rim support shaft;

a claw means disposed inside said rim support shaft for selectively engaging with and disengaging from at least one of said engaging projections;

a shift means for shifting said claw means between an engaging position where said claw means engages with at least one of said engaging projections to prevent said coupling shaft from shifting along its axial direction and a disengaging position where said claw means disengages from said engaging projections to allow said coupling shaft to freely shift along its axial direction; and a drive means for driving of said shift means, whereby a tim width of said tested wheel to be held with an engaging position between said claw means and said engaging projections.

2. The measuring apparatus according to claim 1, wherein said claw means is formed on confronting surfaces of a pair of chuck claws provided at both sides of said coupling shaft.

3. The measuring apparatus according to claim 2, wherein said chuck claws have lower ends hingedly supported inside said rim support shaft.

4. The measuring apparatus according to claim 3, wherein said shift means includes:

an operation shaft disposed inside said rim support shaft and slidable along the axial direction of said rim support shaft;

a cam follower disposed on each chuck claw to be normal to a swing plane of said chuck claw;

a cam plate fixed on said operation shaft and formed with a cam groove into which said cam follower slidably engages; and said drive means raising or lowering said operation shaft, wherein said cam follower causes shift movement along said cam groove in response to the raising or lowering movement of said operation shaft, and said chuck claws cause swing motion in response to this shift movement of the cam follower so that said claw means can engage with or disengage from said engaging projections.

5. The measuring apparatus according to claim 4, wherein said shift means further includes an urging member for urging said chuck claws to said engaging position, and said cam groove is formed in such a fashion that said chuck claws are moved from said engaging position to said disengaging position against the urging force of the urging member while said operation shaft is raised.

6. A wheel balance measuring apparatus which includes:

a frame;

a hollow rim support shaft supported by said frame through a bearing so as to be rotatable about a vertical axis;

means for rotating said hollow rim support shaft;

a detecting means connected to said bearing for detecting displacement load of said bearing, which is caused due to weight unbalance of a rotating tested wheel;

a lower rim mounted on said hollow rim support shaft;

an upper rim positioned above and confronting with said lower rim, so as to be shiftable along and rotatable about the vertical axis;

a coupling shaft connected integrally with said upper rim and extending downward from said upper rim along its rotational axis so as to be inserted into or pulled out from said hollow rim support shaft;

an engaging means for restricting an axial position of said coupling shaft; and at least three abutting portions provided on either the outer surface of said coupling shaft or inside surface of said rim support shaft, being spaced from one another in a circumferential direction, said abutting portions being protrusions extending along an axial direction of said coupling shaft;

wherein a tested wheel is sandwiched between said upper and lower rims and is rotated together with said hollow rim support shaft for measuring dynamic balance of said tested wheel.

7. The measuring apparatus according to claim 6, wherein said abutting portions are formed on the outer surface of said coupling shaft.

8. The measuring apparatus according to claim 7, wherein said abutting portions are formed only at one end of said coupling shaft, positioned close to said upper rim.

9. The measuring apparatus according to claim 7, wherein said abutting portions are provided at three positions so as to uniformly divide the periphery of said coupling shaft into three peripheral sections.

10. A wheel balance measuring apparatus which comprises:

a frame;

a hollow rim support shaft supported by said frame through a bearing so as to be rotatable about a vertical axis;

means for rotating said hollow rim support shaft;

a lower rim mounted on said hollow rim support shaft;

an upper rim positioned above and confronting with said lower rim, so as to be shiftable along and rotatable about the vertical axis;

means for affixing said lower rim and said upper rim with a wheel whose balance is to be tested sandwiched therebetween;

a detecting means connected to said bearing for detecting displacement load of said bearing, which is caused due to weight unbalance of a rotating tested wheel; and a connecting means for connecting said bearing and said detecting means in such a manner that the connecting means has high rigidity in a detection direction of said detecting means and low rigidity in other directions;

whereby the tested wheel is sandwiched between said upper and lower rims and is rotated together for measuring dynamic balance of said tested wheel on the basis of the displacement load detected by said detecting means.

11. The measuring apparatus according to claim 10, wherein said connecting means includes:

a connecting shaft portion, formed in a long and thin bar shape, so as to have high rigidity in its axial direction and low rigidity in its bending direction;

one connecting plate on which said bearing is mounted, connected with one end of said connecting shaft portion; and another connecting plate on which said detecting means is mounted, connected to the other end of said connecting shaft portion.

12. The measuring apparatus according to claim 11, wherein said connecting plates are normal to the axis of said connecting shaft portion.

13. The measuring apparatus according to claim 11, wherein said connecting shaft portion has tapered end portions, gradually increasing their diameters as they approach the corresponding connecting plates.

* * * * *